(12) United States Patent
Bech et al.

(10) Patent No.: US 9,719,487 B2
(45) Date of Patent: Aug. 1, 2017

(54) WIND TURBINE BLADE STRUCTURES, LIFTING ASSEMBLIES AND METHODS OF BLADE HANDLING

(75) Inventors: Anton Bech, Ringkøbing (DK); Mark Hancock, Southampton (GB); Peter Frans Thomsen, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1057 days.

(21) Appl. No.: 13/822,169

(22) PCT Filed: Sep. 15, 2011

(86) PCT No.: PCT/DK2011/050347
§ 371 (c)(1),
(2), (4) Date: May 28, 2013

(87) PCT Pub. No.: WO2012/034566
PCT Pub. Date: Mar. 22, 2012

(65) Prior Publication Data
US 2013/0236324 A1   Sep. 12, 2013

Related U.S. Application Data

(60) Provisional application No. 61/473,856, filed on Apr. 11, 2011, provisional application No. 61/473,854, filed on Apr. 11, 2011.

(30) Foreign Application Priority Data

Sep. 15, 2010 (DK) .................................. 2010 70399
Sep. 15, 2010 (DK) .................................. 2010 70401

(51) Int. Cl.
*F03D 1/00* (2006.01)
*F03D 1/06* (2006.01)
(Continued)

(52) U.S. Cl.
CPC ............ *F03D 1/0633* (2013.01); *B66C 1/108* (2013.01); *F03D 13/10* (2016.05); *F03D 13/40* (2016.05);
(Continued)

(58) Field of Classification Search
CPC ....... F03D 1/001; F05B 2230/61; B66C 1/108
See application file for complete search history.

(56) References Cited

U.S. PATENT DOCUMENTS 7,353,603 B2 * 4/2008 Wobben .................. F03D 1/001
29/434
7,832,987 B2 * 11/2010 Haarh ..................... B66C 1/108
416/146 R (Continued)

FOREIGN PATENT DOCUMENTS

DE   102008055537 A1   6/2009
DE   202010002679 U1   7/2010
(Continued)

OTHER PUBLICATIONS

International Bureau, International Preliminary Report on Patentability issued in corresponding International Application No. PCT/DK2011/050347 dated Mar. 19, 2013, 8 pages.
(Continued)

*Primary Examiner* — Woody Lee, Jr.
(74) *Attorney, Agent, or Firm* — Wood Herron & Evans LLP (57) ABSTRACT

A wind turbine blade 2 is formed with structures allowing its lifting by a lifting apparatus 4, the blade comprising upper and lower blade shells and an internal load-bearing structure comprising an internal spar 16 or internal webs, a plurality of lifting points 20 arranged about the blade center of gravity, comprising openings for receiving lifting members 24 of a lifting apparatus insertable therein into structures 22 secured to the load-bearing structure, and with a locking connection being established between the lifting members 24 and the load-bearing structure 16.

35 Claims, 8 Drawing Sheets

(51) Int. Cl.
*B66C 1/10* (2006.01)
*F03D 80/00* (2016.01)
*F03D 13/10* (2016.01)
*F03D 13/40* (2016.01)
*F03D 80/50* (2016.01)

(52) U.S. Cl.
CPC ............ *F03D 80/00* (2016.05); *F03D 80/50* (2016.05); *F05B 2230/61* (2013.01); *Y02E 10/721* (2013.01); *Y02P 70/523* (2015.11)

(56) References Cited

U.S. PATENT DOCUMENTS

2005/0258064 A1* 11/2005 Wobben .............. B65D 85/68 206/523
2010/0018055 A1* 1/2010 Lynderup ............ B66C 1/108 29/889
2010/0129229 A1 5/2010 Grabau
2011/0142660 A1* 6/2011 Bakhuis .................. B60P 3/40 416/223 R

FOREIGN PATENT DOCUMENTS

WO 2004070203 A2 8/2004
WO 2005071261 A1 8/2005

OTHER PUBLICATIONS

International Searching Authority, International Search Report and Written Opinion issued in corresponding International Application No. PCT/DK2011/050347 dated Feb. 10, 2012, 12 pages.
Danish Patent and Trademark Office, DK Combined Search and Examination Report issued in corresponding DK Application No. PA 201070399 dated Apr. 29, 2011, 5 pages.

* cited by examiner

WIND TURBINE BLADE STRUCTURES, LIFTING ASSEMBLIES AND METHODS OF BLADE HANDLING

FIELD OF THE INVENTION

The present invention relates to lifting assemblies for handling wind turbine blades, to blades adapted to be lifted with such an assemblies, and to methods of blade handling.

BACKGROUND OF THE INVENTION

With the growing acceptance of wind turbines as a commercially viable source of energy, and the continuous drive for reducing the cost of the produced energy, the size of turbines continues to increase. At the time of writing, all major turbine manufacturers have turbines in the 2-3 MW range, and most are developing larger models in the 3-7 MW range. Such models will typically have rotor blades which are in the region of 50 to 70 m or even larger, and weighing in the region of 5-7 tonnes or more.

The handling of these large blades during manufacture, transport to the turbine site, during installation, repair or replacement becomes increasingly problematic. Conventional handling techniques involve the use of slings which encircle the blades in the chordwise direction, and are connected to a crane lifting hook or eye. The use of such slings is potentially problematic in that these slings do not make a direct fixed connection to the blade, and are thereby susceptible to relative sliding of the blade within the sling. Moreover, if not carefully arranged, the slings can exert potentially damaging forces on parts of the blades, particularly the relatively delicate trailing edge. If the blade is provided with dynamically operative structures such as trailing edge flaps, these are particularly susceptible to damage. In addition, there is the potential for damage to the blade's structural integrity, in that the blade structure is designed in order to accommodate loading during normal use when in its operating position mounted at its root end on the rotor hub, and is not designed having particular regard to loads during lifting when constrained at or near the central region of the blade.

It has previously been proposed in Applicant's WO2005/071261 to provide the blade with mounting holes which penetrate the top and bottom blade shells, with bracket-like handling components arranged against the opposite blade surfaces and connected by bolts extending through the mounting holes. Such a structure enjoys several benefits of thereby providing a fixed lifting point, and allowing a firm grip to be provided on the blade.

The present invention seeks to provide, in a development of this structure, a blade structure and associated lifting assembly which overcomes the drawbacks discussed above, and is able to provide effective and safe lifting in particular of very large blades, and with good load distribution characteristics.

SUMMARY OF THE INVENTION

In a first aspect the invention provides a wind turbine blade comprising: opposed blade surfaces, an internal load-bearing structure, a plurality of lifting points in at least one of the blade surfaces comprising lift openings through the blade surface adjacent or into the load-bearing structure for receiving lifting members insertable therein, and wherein the load-bearing structure is adapted to make load-bearing connection to the lifting members inserted in said openings.

The lifting points may be arranged generally equidistantly spaced about the centre of gravity, for example four such points may be provided, or they may spaced along the blade for example in pairs, or points could be provided in the vicinity of the centre of gravity and also in the region of the blade tip in order to provide additional support at the tip.

The load-bearing structure preferably comprises, as is conventional, load-bearing webs or beams extending between the blade surfaces. Lateral openings are then provided in these web portions to receive locking elements such as locking pins or the like insertable into the lateral openings and into inserted lifting members making load-bearing connection between the load-bearing web portions and lifting members. These lateral openings are preferably provided at or near the neutral axis of the blade. The load-bearing webs may be incorporated into a spar structure having opposed spar cap portions interconnected by the web portions generally perpendicular thereto, being spar web portions.

In one preferred form the lift openings are defined in structures secured to or forming part of the load-bearing structure, such as tubular structures adjacent to and secured to the beams or spar webs. Lateral openings are provided in the structures defining the lift openings which are aligned with lateral openings in the beams or webs, in order to receive the locking elements therein.

In a further aspect the invention resides in a lifting assembly for a wind turbine blade as described above comprising lifting members for insertion in the lift openings and locking devices for locking the inserted lifting members to the blade. The lifting members preferably comprise elongate lift pins, and these may be freely suspended from a spreader which in use is connected to a crane lifting eye or hook, wherein the locking devices comprise locking pins insertable through the lateral openings in the blade webs or spar webs into aligned openings in the lifting members. Alternatively, a structure may be provided in which the lifting members form part of a rigid lifting frame. Such a structure allows lifting in of the blade in edge-down or tip-down or other intermediate orientations.

In a still further aspect the invention resides in a method of handling a wind turbine blade as described above comprising the steps of: inserting lifting members of a lifting assembly into the respective lift openings; and connecting the lifting members to the load-bearing structure. Where the blade includes lateral openings into the beams or webs, the method including the step of inserting locking elements into aligned openings in the lifting members and beams or webs. Where the blade has lift openings defined in lift tubes secured to the blade webs, with lateral locking openings in the webs and lift tubes, the method involves insertion of the lifting members into the lift tubes and the insertion of locking elements such as locking pins into aligned openings in the webs, lift tubes and the inserted lifting members.

In an alternative preferred arrangement the lift openings are defined in structures extending laterally from the beams or webs. A locking structure may be provided in the form of locking surfaces against which portions of the lifting members can engage. The locking surfaces may be configured to allow a push and twist locking connection between the laterally extending structures defining the lift openings and a locking portion of a lift member inserted therein. In one form the locking surfaces comprise a lower abutment surface against which a laterally protruding portion on a lift member can abut, and a surface spaced therefrom defining therebetween a retention groove within which the laterally protruding portion can engage when rotated into a locking orientation, and having a cutout region allowing insertion of the lift member and passage into the groove of the laterally protruding portion when in a predetermined insertion orientation.

A further aspect of the invention may then reside in a lifting assembly for such a wind turbine comprising one or more elongate lift members having laterally protruding portions for engaging locking surfaces on or connected to the load-bearing structure.

A further aspect of the invention then resides in a method of handling a blade comprising the steps of inserting lifting members into the respective lift openings and connecting the lifting members to the load bearing beams or webs by engaging the locking surfaces by rotating the lift members into a locking orientation.

In a still further form the internal load-bearing structure includes a pair of spaced beams or webs, which webs may be a part of a spar structure, each provided with a lateral opening to receive therebetween a lifting bar of a lifting assembly. The lateral openings are again preferably provided at or near the neutral axis of the blade in order to limit the stresses at the connection points.

It may be arranged that the beam or web portions are of increased thickness at the positions of the openings.

In a further aspect the invention resides in a lifting assembly for a wind turbine blade as defined above comprising a lift bar for receipt within the opposed web openings, and a lifting connection structure in the form of wires, rope or webbing straps, loops, strops or a lifting yolk or the like for extending through the lift openings in the blade and engaging the lift bar. The lift bar may comprise a pair of oppositely-extending pins which are relatively extendable/retractable, for example from a central sleeve. To this end one or both of the pins may be connected to the central sleeve by a screw thread.

In a further form the lifting connection structure is a lifting yolk having yolk arms for engaging the lift bar. These may for example have hook connections at their ends for engaging the lift bar.

A further aspect of the invention resides in a method of blade handling of such a blade including the steps of: introducing a lift bar into the blade between load-bearing webs; inserting lifting elements comprising wires, rope or webbing straps, loops, strops or a lifting yoke or the like adjacent the load-bearing webs through the openings in the blade surface; and arranging the lift bar so as to extend between the load-bearing webs and fitting into the opposed openings whilst engaging the lifting connection structure. The lift bar is preferably extendable/contractible and is introduced between the webs in a contracted configuration, and is extended to fit into opposed openings whilst engaging the lifting connection structures.

For any of the above described blade structures in order to distribute loading one or more internal bulkheads may be provided between the blade surfaces extending in the blade chordwise direction in the vicinity of the lifting points.

The openings for the lifting members may be closable by covers, which may be pivotably mounted on the blade and are sprung so as to close on removal of a lifting member therefrom. Alternatively, other structures such as plugs may be utilised.

BRIEF DESCRIPTION OF THE DRAWINGS

Embodiments of the invention are now described, by way of example only, with reference to the following drawings in which:

FIGS. 15($a$) and ($b$) show cross-sectional details of the blade and lifting assembly of FIG. 14, in engaged and detached conditions respectively;

FIGS. 18($a$) and ($b$) show a still further embodiment of a blade and lifting assembly;

FIG. 19 shows a lifting member of the embodiment in FIG. 18; and

FIG. 20 shows a lock housing for locking of the lifting member of FIG. 19.

DETAILED DESCRIPTION OF THE PREFERRED EMBODIMENTS

Figure 1:
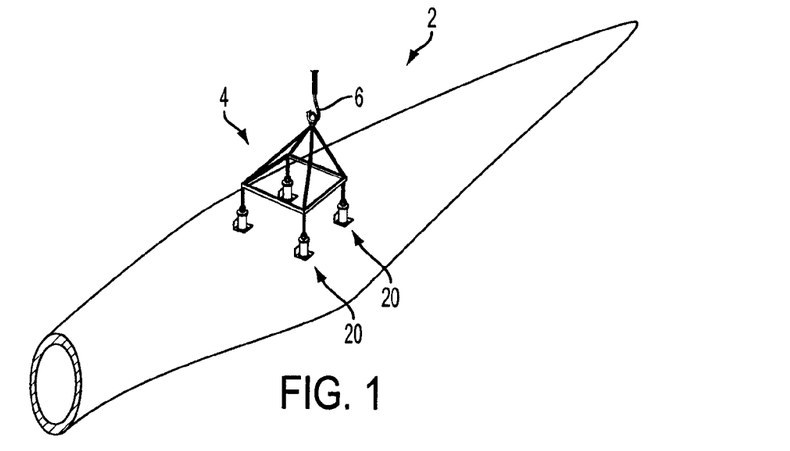
FIG. 1 is a general view of the lifting apparatus according to an embodiment of the invention when lifting a wind turbine blade.
Figure 2:
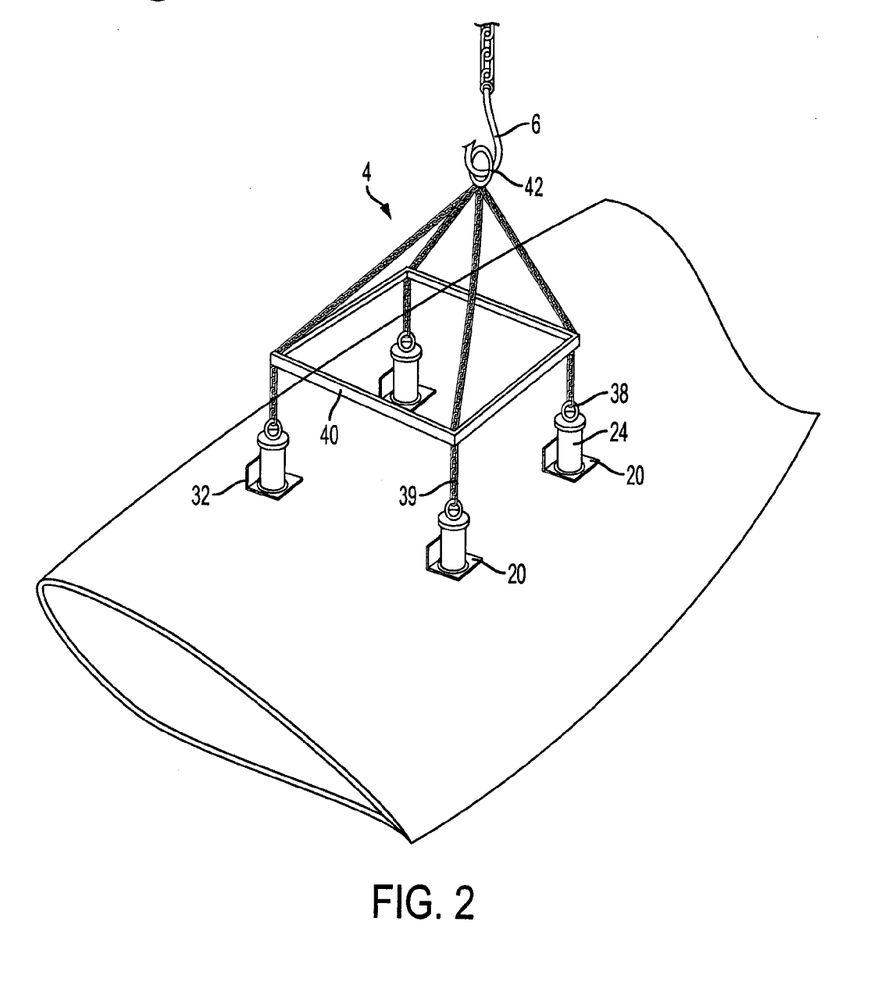
FIG. 2 is an enlarged view of the lifting apparatus connected to a blade.

Turning to the drawings, FIG. 1 shows a wind turbine blade, generally indicated 2, being lifted by a lifting assembly 4 which is connected to a lifting hook 6 suspended from a crane (not shown). As indicated in FIGS. 1 and 2, the blade is provided with lifting points 20, most preferably four such lifting points, provided spaced equidistantly about the blade's centre of gravity and to which the lifting assembly is attached, whereby when lifted the blade adopts a balanced orientation.

As an alternative to four such lifting points, a pair of lifting points could be utilised, arranged equidistantly about the centre of gravity. As a further alternative, the lifting points could be spaced in pairs arranged along the blade, for example one pair could be located at a position between the centre of gravity and the root end, and a second pair between the centre of gravity and the tip end. As a still further alternative, further additional lifting points could be provided so that 6 or 8 points are provided. For example lifting points could be provided in the vicinity of the centre of gravity, with additional points near the blade tip to provided additional support at this position.

Figure 5:
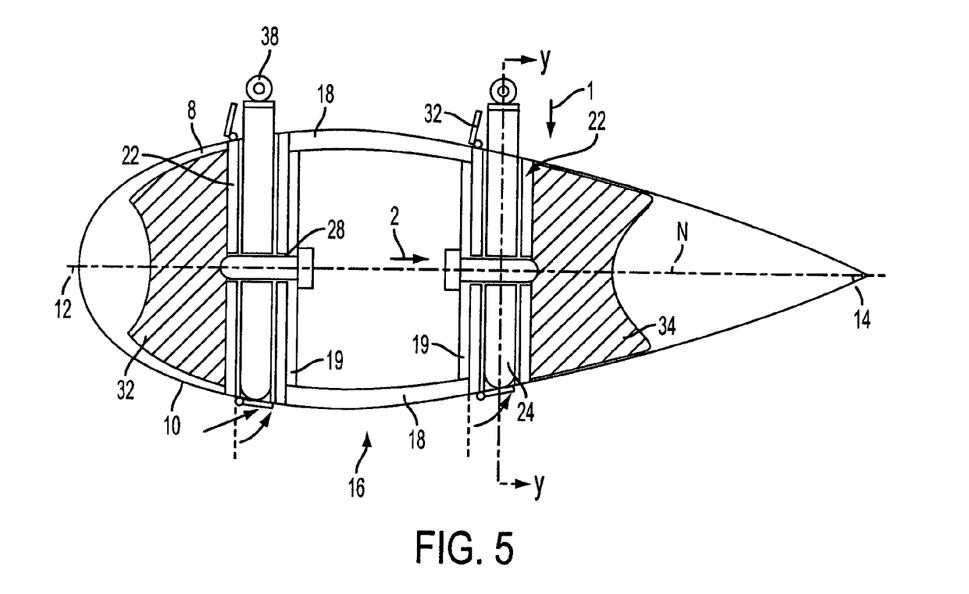
FIG. 5 is a cross-sectional view along the line X-X of FIG. 4.

As seen in FIG. 5, the blade 2 comprises a pair of blade shells 8, 10 defining blade surfaces and joined at a leading edge 12 and a trailing edge 14. An internal load-bearing structure is provided in the form of a spar 16 comprising opposed spar caps 18 connected by shear webs 19 extending generally perpendicular to the caps 18 and forming a box-like structure. The spar caps 18 may, as illustrated, form part of the outer aerodynamic surfaces, or may be enclosed beneath the opposed blade shells 8, 10. As is well known, the spar 16 serves as the primary load-bearing element within the blade, extending from a point at or near the blade root towards the blade tip. Although a structure is shown incorporating a load-bearing member in the form of a complete spar, the invention is equally applicable to structures where the load-bearing structures are individual beams or webs extending between the blade shells.

Figure 4:
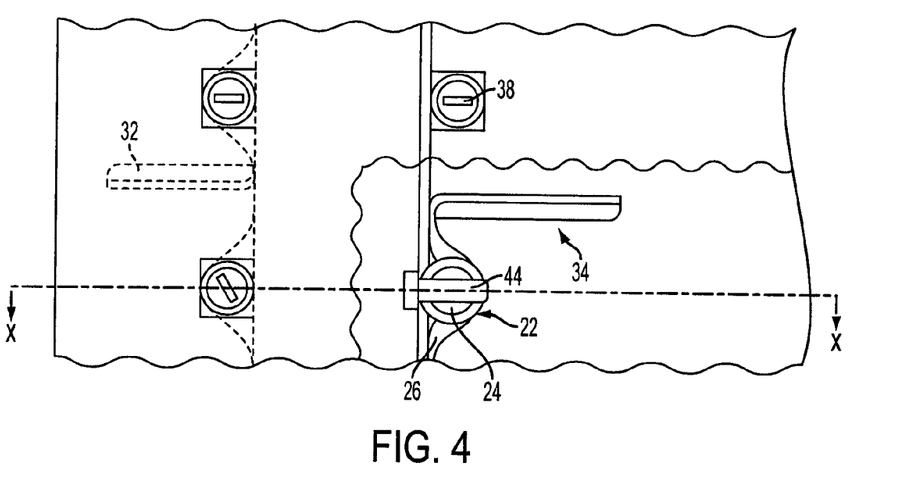
FIG. 4 is a plan and partly cut-away view of the lifting region of the blade according to an embodiment of the invention.

At the lifting points 20, the blade is formed with lift openings in defined in respective shear tubes 22 arranged adjacent to and outboard of the blade spar 16, for receiving lift members in the forms of lift pins 24 of the lifting assembly, as further discussed below. As shown, these are of circular section, but they might be of square or other polygonal section. These shear tubes 22 extend adjacent to and are structurally connected to the shear webs 19 being bonded thereto through web portions 26 or through other fixings such as brackets. Alternatively the shear tubes 22 may comprise mouldings formed on the webs, possibly formed at the same time as the shear webs 19, in which the openings are defined. On a blade structure where the load-bearing elements are individual webs, the shear tubes extend adjacent to these webs.

Figure 6:
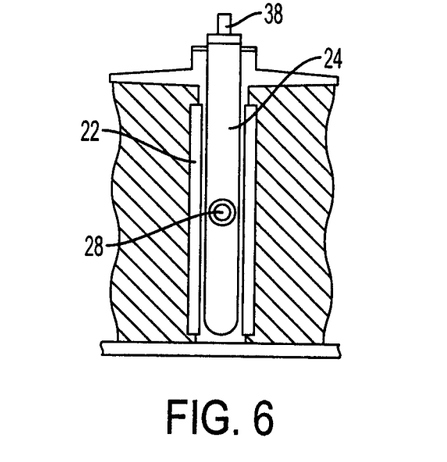
FIG. 6 is a schematic cross-sectional detail along the line Y-Y of FIG. 5.

The shear tubes 22 extend from and open out at the upper blade surface (that is 'upper' in the lifting orientation in which the suction surface of the blade is uppermost), extending to the lower blade surface where they may also open out at this lower blade surface. At the approximate midpoint of the shear tubes 22 at a position which corresponds to the neutral axis N of the blade, aligned lateral openings are provided through the shear tubes 22 and shear web 19 for receiving shear pins 28 of the lifting assembly. Location of the shear-pin-receiving openings at the neutral axis ensures that structural integrity and load-bearing capacity of the spar 16 is not compromised by presence of these openings. This structure allows loads to be evenly and effectively spread from the shear tubes to the shear webs. Moreover, the location of these openings on the neutral axis N ensures that any stress concentrations which might occur from holes and from other elements of the lift system are minimised.

Figure 3:
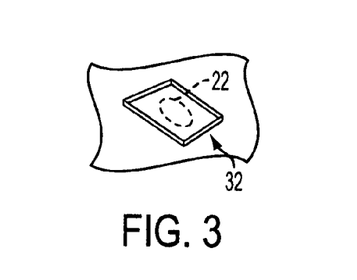
FIG. 3 is a detail showing a lifting hole cover.

The openings at the lifting points 20 are closed by spring-mounted covers 32, which during handling are held open by the inserted lift pins 24, and which on removal of the lift pins 24 are urged closed, the covers 32 when closed being flush with the blade surface, maintaining aerodynamic continuity of the blade surface. As an alternative, screw-in plugs or expanding plugs may be used to achieve a flush surface when not lifting.

In the vicinity of the blade lifting region the blade may be provided with additional internal load-bearing structures such as transverse bulkheads, including forward bulkhead 32 extending from the spar 16 towards the leading edge, and rear bulkhead 34 extending rearwardly from the spar 16 towards the trailing edge. These serve to further distribute loading in the chordwise direction. Further bulkhead structures can be provided if necessary.

The lifting assembly 4 comprises four lifting members in the form of lift pins 24 associated with the respective lifting points, each being of cylindrical or tubular form (or section to match the shear tube section if non-circular) each having an upper connecting eye 38 for connection by a length of wire, cable or chain or rope 39 to a lifting spreader 40 which is of square form, with the connections being to the corners of the spreader 40. The lifting spreader 40 itself is connected through a chain or other similar connection (wire, rope, sling or the like) to main crane lifting eye 42 to which a crane hook can be connected. Each lift pin 24 is formed with a transverse opening 44 which receives the shear pin 28, with this opening 44 aligned with the openings within the shear tube 22 and the shear web 19 when fully inserted within the shear tube 22. The shear pin 28 is insertable from the interior of the spar 16 in the chordwise direction through the aligned openings. The shear pin 28 has an enlarged head, thereby limiting the insertion of the shear pin 28 as the head abuts the shear web 19 interior, with the leading end of the shear pin 28 extending through the opposite opening in the shear tube 22, thereby effectively locking the lift pin 24 to the spar 16.

During the initial phase of a blade lifting or handling operation (the expression "lifting" is generally used herein but it should be appreciated that this may encompass other handling operations of involving translation or rotation or lowering of a blade), the lifting assembly 4 is secured to a crane, brought over the blade upper surface and lowered generally into position over the blade lifting points 20, with the lift pins 24 dangling beneath the spreader 40. The lifting assembly 4 is further lowered slowly towards the blade surface and the lift pins 24 manually guided into the blade openings. Lowering of the lifting assembly 4 is continued until the lift pins 24 are fully received within their respective shear tubes 22. The shear pins 28 are then manually inserted from within the spar interior extending through the aligned openings in the spar, shear tube and lift pins, locking the lift pins 24 in position. It is to be noted that the internal dimension of the spar 16 in large blades of say 50-70 m length is easily sufficient for internal access by personnel; typically, at this region the spar is of about 1.3 m height and 1 m width. The blade can then be lifted by crane as part of a handling, lifting or installation operation being firmly secured to the lifting assembly 4 and appropriately balanced about its centre of gravity. On blade installation the blade is lifted by the crane up to the position of the turbine hub and secured thereto in conventional manner. Once secured, with tension in the lifting assembly 4 removed, the shear pins 28 can be removed (for example by a manual operation assuming the blade interior can still be safely accessed, or by the activation of a remotely operated driven pin-removing mechanism such as a ram-driven system) and the lifting assembly 4 lifted off the blade, the lift pins 24 sliding out of the shear tubes 22. As the lift pins 24 are extracted the sprung-mounted hole covers 32 are urged closed, obviating the need for any additional manual closing step.

It will be appreciated that a variety of other mechanical connection structures could be utilised to provide releasable connection between the lift pins 24 and the shear tubes 22, such as sprung engagement pins fitting in detents. In a further alternative the shear pins 28 may be formed as bolts and the openings in the shear tubes and/or the lift pins may be formed with a screw thread In a variant, instead of a providing a single connection point within each shear tube 22 it may be arranged that additional connections are provided, for example each shear tube 22 may be formed with a pair of transverse openings, one towards the top and the other near the bottom of the shear tube. The lift pins are then appropriately arranged with corresponding openings also near top and bottom of the pins, and with respective shear pins provided for each opening.

Figure 7:
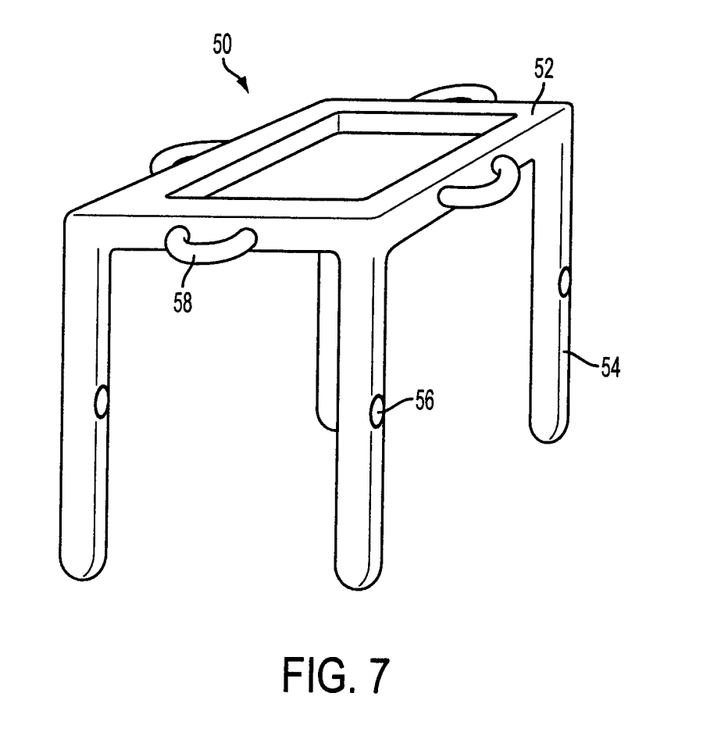
FIG. 7 shows an alternative lifting apparatus comprising a lifting frame.
Figure 8:
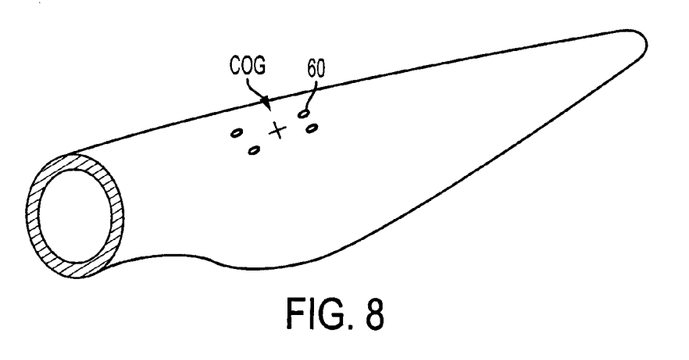
FIG. 8 is a view of a wind turbine blade with lifting points according to a further embodiment of the invention.
Figure 9:
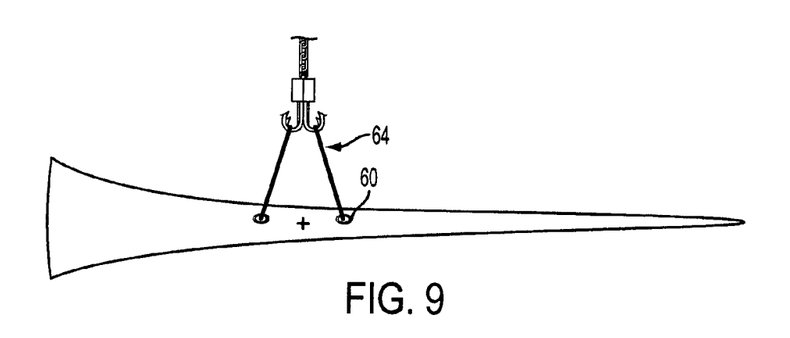
FIG. 9 is an edgewise view of the blade of FIG. 8 when being lifted.

In FIG. 7 there is shown a lifting assembly in which the lift pins are incorporated into a rigid frame-like structure which facilitates the lifting and/or supporting of the blade in other orientations. The lifting frame 50 comprises a base 52 from which depend four pins 54 spaced to align with the blade lifting points 20, being receivable in the blade shear tubes 22 in identical manner to the lift pins 24 of the earlier described structure. Each pin 54 has a respective opening 56 through which, in use, the shear pins 28 can be inserted. The base of the frame has a number of fixing points 58 for the attachment of fixings or hooks providing connection to a crane. The lifting frame 50 allows supporting of the attached blade in other orientations, such as an edge-down orientation, or a tip-down orientation.

Figure 10:
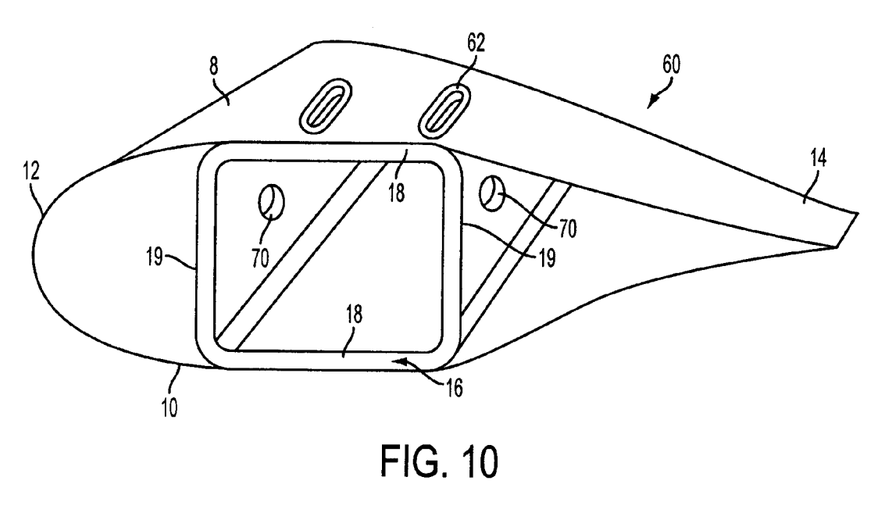
FIG. 10 is a sectional view of the blade of FIGS. 8 and 9 in the region of the lifting points.

An alternative blade structure and lifting assembly therefor is shown in FIGS. 8 to 14, in which like parts are indicated with like reference numerals. As seen in FIG. 10, the blade likewise comprises a pair of blade shells 8, 10 joined at the blade leading edge 12 and trailing edge 14. An internal load-bearing structure in the form of a beam or spar 16 of elongate generally box-like form is provided onto which the blade shells are secured. As is well known, the spar 16 serves as the primary load-bearing element within the blade, extending from a point at or near the blade root towards the blade tip. This spar 16 may take a variety of specific forms, but most typically comprises opposed spar caps 18 which lie parallel to the blade surface interconnected by shear webs 19 which are generally perpendicular to the caps. As shown in FIG. 10 the spar caps 18 are enclosed beneath the opposed blade shells, but may alternatively form part of the outer blade aerodynamics surfaces.

At the lifting points here indicated 60, the blade is formed with openings 62 through the blade shell surface 8 and underlying spar cap 19 extending into the spar 16 interior (noting that if a structure is provided where the spar cap forms the outer surface at this region, the openings will then be directly into the spar cap). These openings 62 receive flexible lifting elements in the form of wire, rope or webbing straps, strops, loops or the like 64, these being part of the lifting assembly. Most conveniently, these lifting elements are wires with lifting eyes or loops 66. The openings are then preferably of slightly elongate form in the longitudinal direction of the blade, whereby the lifting eyes 66 can be readily inserted therein.

At the position of the lifting points the blade may be provided internally with additional reinforcing bulkheads (not shown) extending between the shells in the chordwise direction.

Figure 11:
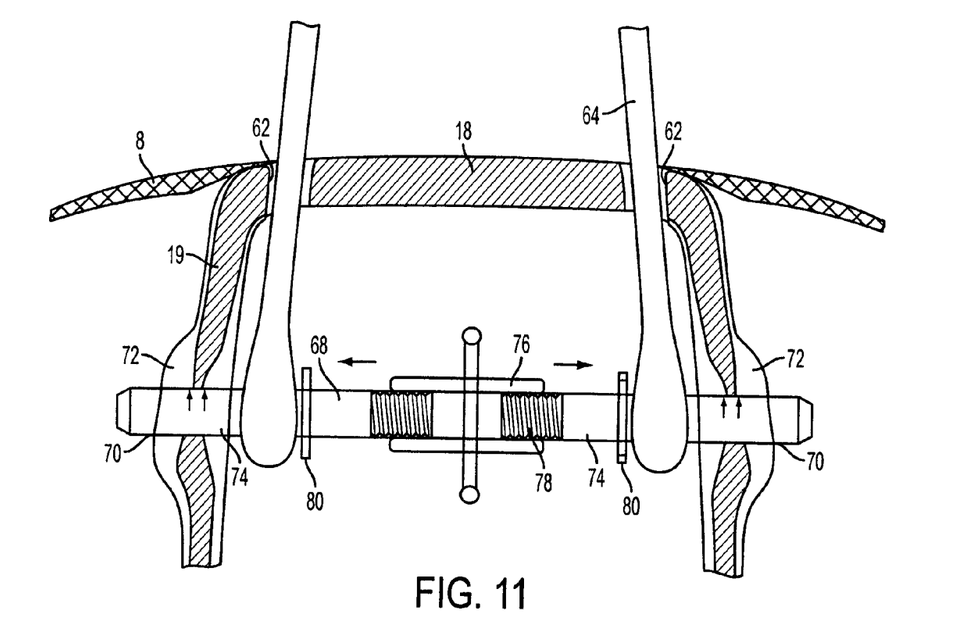
FIG. 11 is a sectional detail of the blade with lift bar and lift straps inserted.
Figure 12:
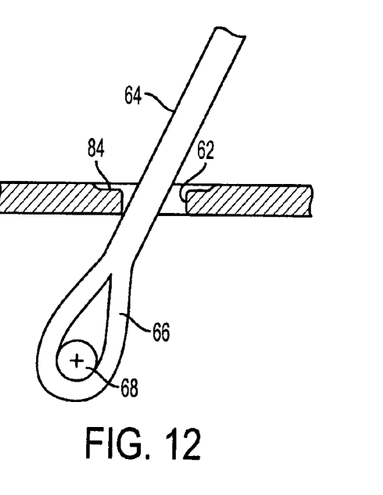
FIG. 12 is a sectional detail taken perpendicular to the view of FIG. 11 of the lifting strap and lifting bar.

The lifting elements, strops or similar 64 are connected to the blade by means of a lift bar 68 one such bar associated with a laterally spaced pair of lifting points, the bars are arranged extending across the interior of the spar 16 into opposed openings 70 provided in the shear webs 19 of the spar 16 (or into individual webs if provided). As can be seen in FIG. 11 the shear webs 19 may be reinforced at the position of the openings 70 through the use of a surrounding region of additional wall thickness indicated 72. As an alternative to, or in addition to this region of extra wall thickness load-carrying inserts say of metallic material might be used. The openings 70 are preferably arranged at the neutral axis of the spar, thereby minimising stress concentrations at this position.

Although a structure is shown incorporating a load-bearing member in the form of a complete spar, the invention is equally applicable to an arrangement where the load-bearing structures are individual beams or shear webs extending between the blade shells, preferably arranged as a pair of spaced webs, such that the lift bars can extend between the shear webs.

It will be appreciated that other simple mechanical structures might be utilised as an alternative to the lift bar, such as hooks on the webs to which the lifting strops can be engaged, or pins or bolts other connection structures insertable into structures on the webs. For example the openings 70 may have threads into which bolts are screwed.

Each lift bar 68 is preferably of telescopic form in order to facilitate its insertion and removal on connection/disconnection of the lifting assembly. More particularly, the lift bar 68 comprises a pair of oppositely facing pins 74 retractable within a central sleeve 76. As illustrated the pins 74 are movable relative to the sleeve 76 through a screw connection 78, but might alternatively be slidingly retractable, for example against a spring force, or hydraulically or pneumatically actuatable, for example by operation of a ram. The pins 74 are formed with collars 80 which serve to maintain the eyes 66 of the strops outward adjacent the spar web openings 70.

Figure 13:
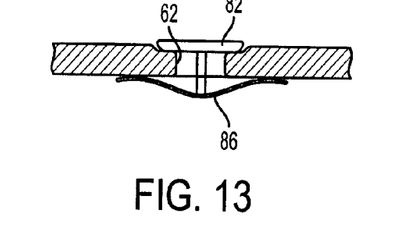
FIG. 13 is a sectional detail of a lift hole-closing cover.

When not in use the openings 62 of the lifting points 60 are closed by covers 82, which are manually inserted and which present an exterior surface which is flush with the blade surface, maintaining aerodynamic continuity of the blade surface. To facilitate this, the openings 62 may define a lip 84 against which the cover 82 sits. The cover 82 may on its underside have a rear spring portion 86 exerting a compressive force against the underside of the spar cap serving to pull the cover 82 tight into the opening 62 and against the lip 84.

During a blade handling operation, the lower ends of the lifting strops 64 are manually inserted through respective openings 62 after the covers 82 have been removed. The lift bars 68 are carried internally along the interior of the spar 16 until the position of the lifting points 60 and with the pins 74 retracted the eyes 66 of a pair of strops are looped over the respective pins 74. The pins 74 are then arranged laterally across the spar 16 and the pins extended so as to extend through the opposed openings 70, with the eyes 66 arranged between the collar 80 and the shear web 19. It is to be noted that the internal dimension of the spar 16 in large blades of say 50-70 m is easily sufficient for internal access by personnel; typically, at this region the spar is of about 1.3 m height and 1 m width. The free ends of the lifting strops 64 are secured to a the crane hook in conventional manner. The blade can be lifted by crane as part of a handling, lifting or installation operation being firmly secured to the lifting assembly and securely balanced about its centre of gravity.

After handling (for example on blade installation the blade having been lifted by the crane up to the position of the turbine hub and bolted thereto in conventional manner) with tension in the lifting assembly removed, the lift bars 68 are manually adjusted so that the pins 74 are retracted and the eyes of the lifting strops removed from the lift bars 68, the strops 64 pulled up out of the openings 60, and assuming accessibility of the spar interior, the lift bars 68 can then be removed. The openings 60 are then closed again by the covers 82.

The above-described embodiment shows the lift points arranged over the spar 16 such that openings are made through the spar cap 18, and connection to the spar 16 is made internally within the spar. Alternatively, the lift points can be arranged slightly outboard of the spar position, with the openings being made thorough the blade shell 8 at positions immediately outboard and adjacent the spar webs

19. The lifting assembly is then configured such that the lift bar 68 extends outward through the spar so that the ends thereof can engage the lifting strops 64.

Figure 14:
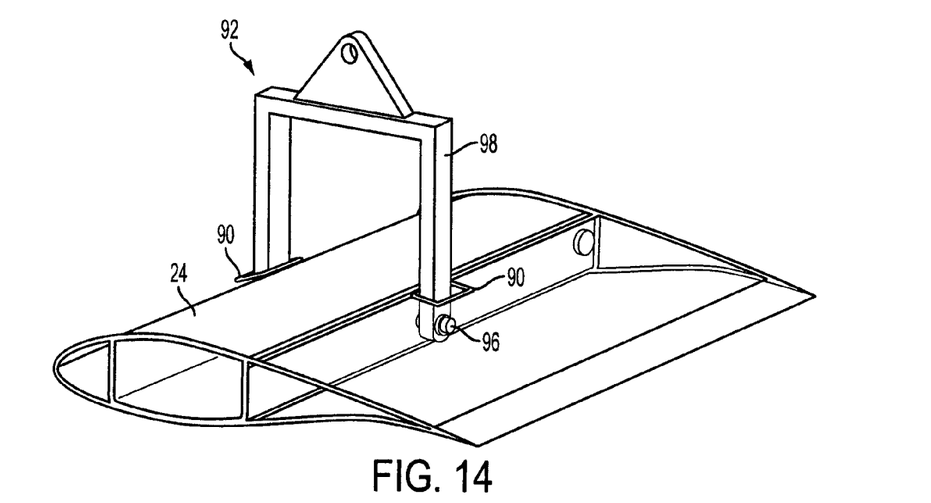
FIG. 14 shows an alternative arrangement of lifting points and lifting assembly according to a further embodiment of the invention.
Figure 15A:
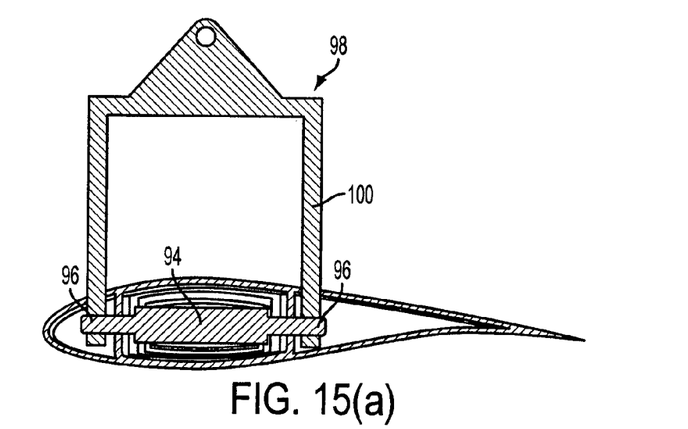
Figure 15B:
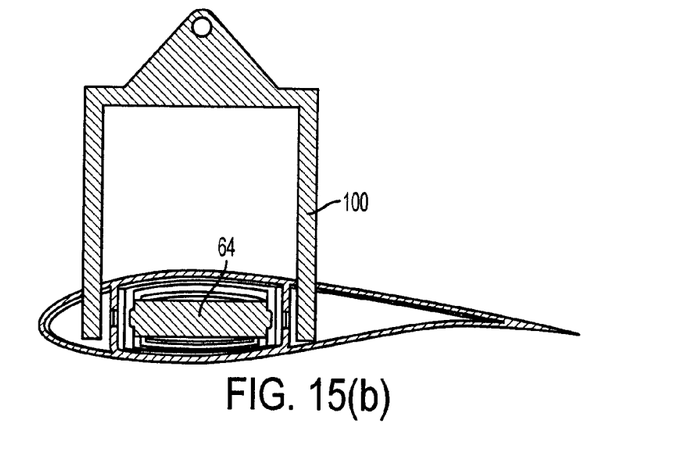

An alternative structure is illustrated in FIGS. 14 and 15. In this arrangement the blade is formed with openings 90 outboard and adjacent the spar 16. The lifting assembly 92 includes a lift bar indicated 94 which includes extendable/retractable locking pins 96 and which is disposed internally within the spar. These pins 96 engage with a lifting structure in the form of a lifting yoke 98, the locking pins 96 being receivable within openings at the lower ends of yoke arms 100. The locking pins 96 are extendable to engage within the openings, as shown in FIG. 15(*a*) whereby a lifting or other handling operation is possible. FIG. 15(*b*) shows the locking pins retracted whereby the yoke 98 can be removed from the blade.

This lifting structure can be employed as the primary blade lift points, for example two pairs of such lifting points could be arranged in the vicinity of and about the centre of gravity. Alternatively, several such lift points could be arranged spaced down the blade. As a further alternative, the structure of FIGS. 8 to 12 could be employed in the region of the blade's centre of gravity, and the structure of FIGS. 14 and 15 employed in the region of the blade tip as an additional tip support.

Figure 16:
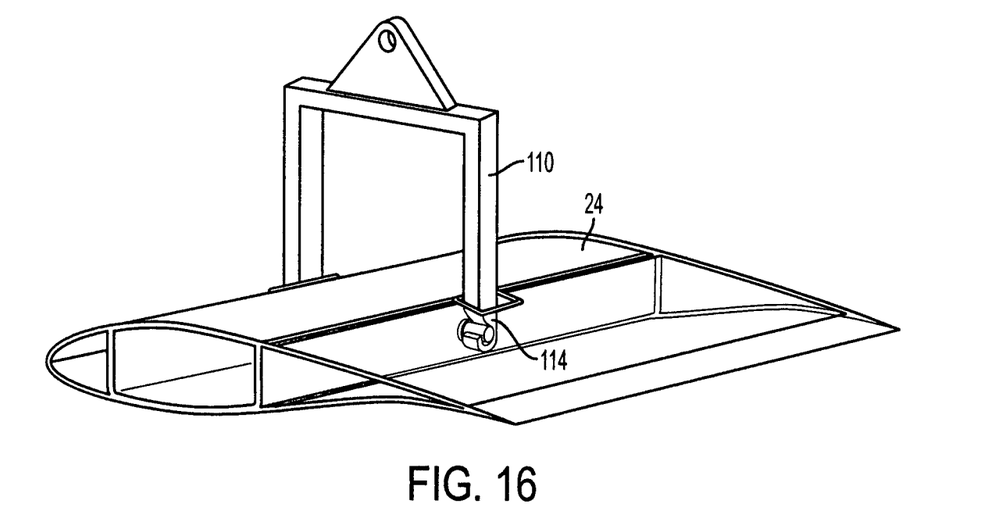
FIG. 16 shows a still further embodiment of a blade and lifting assembly.
Figure 17:
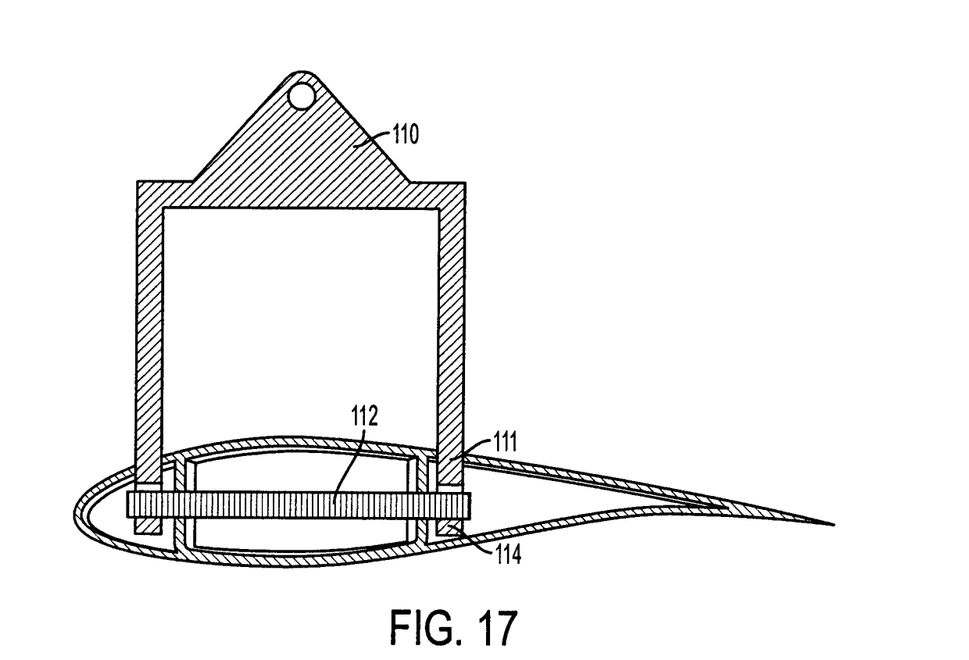
FIG. 17 is a sectional view of the blade and lifting assembly of FIG. 16.

In a still further arrangement generally similar to that of FIGS. 14 and 15 but as illustrated in FIGS. 16 and 17 the lifting yoke 110 makes connection through the blade shell to the spar outboard of the spar position. The lift bar is however formed as a bar 112 of fixed length which extends laterally across the spar 16 and protrudes though the opposed spar webs 19. The yoke 110 is formed with adaptations at the lower ends of the yoke arms 111 allowing engagement/disengagement with the lift bar 112. More particularly, the ends of the arms 111 have hooks 114 which can engage beneath the lift bar 112 ends through appropriate positioning, for example being inserted at an inclined orientation and then twisted and lifted into a vertical orientation.

Figures 18A, 18B, 19, 20:
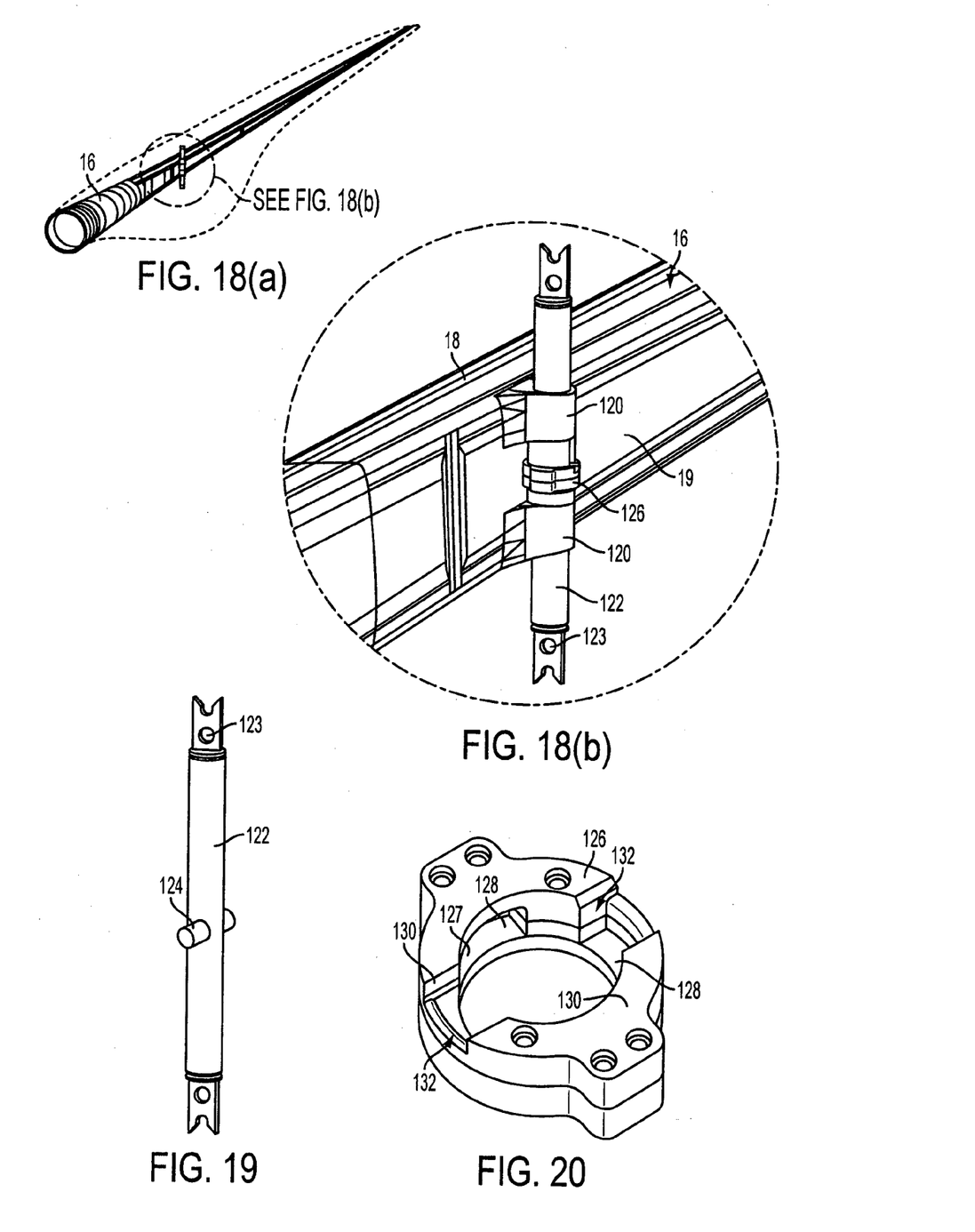

In a still further arrangement as illustrated in FIGS. 18 to 20 a blade and lifting assembly are likewise configured to make load-bearing connection via the spar or web but through an alternative connection structure. FIG. 18(*a*) shows the blade spar 16, with the blade profile indicated in outline, and shows the structures at just one lifting point; it will be appreciated however that at least two, more usually four such lifting points will be employed. More particularly, the spar webs 19 are formed on opposite sides thereof with connection structures 120 protruding outwardly therefrom defining lift openings therein for receiving the lifting assembly. These connection structures 120 may be bonded to or formed unitarily with the spar and in particular the spar webs 19, or connected thereto by other means such as bolts or brackets or other fixings.

The lifting assembly here includes lifting rods 122 for insertion into the lift openings at the respective lift points. The lifting rods 122 are provided at their ends with eyes 123 for attaching lifting lines, strops hooks or the like for attachment to a crane. Alternatively, the rods may be interconnected as part of a frame-like arrangement for use in manipulating blades, in particular blade turning, as described in Applicant's Danish Patent Application No. 2011 70264 the contents of which are hereby incorporated by reference. Each lifting rod 122 is formed in the region of its midpoint with a locking pin 124, this being a short pin extending laterally from the rod 122, preferably from opposite sides thereof. As illustrated in FIG. 18(*b*) the spar web 19 is provided between the connection structures 120 with a lock housing 126 secured thereto through which the rod 122 is inserted and at which the lock pin 124 can be lockingly engaged. FIG. 20 shows the lock housing 126 as separated form the spar, and without showing its connection to the spar. The lock housing 126 may be formed by a separate component or components for example of metal which is connected to the spar web 16 by bonding or other fixing, or it may be secured through an overmoulding process. Conveniently, the lock housing 126 may be constituted by upper and lower housing parts joined together by bolts or screws, for ease of casting/machining.

The lock housing 126 has an axial bore allowing the lower end of the rod 122 to be inserted therein. It defines a pair of part circular retention grooves for retaining the pin, defined between a lower inwardly extending annular abutment surface 128 which prevents passage of the pin 124 and against which the pin 124 abuts, and an upper lip 130. This lip 130 is formed with a cut out region or regions 132 for receiving the locking pin 124 only when inserted in a predefined unlocked insertion orientation. When the rod 122 is inserted and rotated away from this orientation the pin 124 is trapped within the retention groove 128, making a tight connection therein as it reaches the end of the groove. The lift openings in the connection structures 122 are provided with appropriate slots for receiving the pin 124 in a specific insertion orientation, or are dimensioned to accommodate the pin 124.

Although the illustrated embodiment shows two discrete connection structures 120 with the lock housing 126 therebetween the connection structures could be extended to extend substantially the full height of the spar web 19 and the locking housing integrated into these structures, for example by overmoulding.

Thus, the connection structure provides a releasable connection between rods 122 and spar 16, though a push and twist action applied from externally of the blade, without the need for any additional locking pins or the like to be manually inserted from within the blade. It is preferably arranged that the rods 122 are to be inserted and rotated by at least 90 degrees into their locking positions. It is also advantageous if the lock housing 126 is located at least approximately at the neutral axis of the blade to minimise stresses and deformation of the locking structures and the blade spar.

While the present invention has been described with reference to the particular embodiments described herein it will be readily appreciated by those skilled in the art that various modifications are conceivable without departing from the scope of the invention as defined by the following claims.

The invention claimed is:

1. A wind turbine blade comprising:
opposed blade surfaces;
an internal load-bearing structure comprising at least one beam or web having a portion extending between the blade surfaces generally perpendicularly thereto; and
a plurality of lifting points in at least one of the blade surfaces comprising lift openings through the blade surface adjacent or into the load-bearing structure for receiving lifting members insertable therein;
wherein the at least one beam or web is adapted to make load-bearing connection to lifting members inserted in said openings at the portion extending between the blade surfaces.

2. The wind turbine blade according to claim 1 wherein the at least one beam or web is provided with lateral openings to receive locking elements insertable into the lateral openings and into aligned openings in inserted lifting members.

3. The wind turbine blade according to claim 2 wherein the load-bearing structure comprises a spar having opposed spar cap portions interconnected by beam or spar web portions generally perpendicular thereto, and wherein the lateral openings are provided in the spar web portions to receive locking elements insertable into the lateral openings and into openings in inserted lifting members.

4. The wind turbine blade according to claim 2 wherein the lateral openings in the beam or web portions are provided at or near a neutral axis of the blade.

5. The wind turbine blade according to claim 2 wherein the lift openings are defined in structures secured to or forming part of the load-bearing structure.

6. The wind turbine blade according to claim 5 wherein the lift openings are defined in tubular structures adjacent to and secured to the beams or spar webs.

7. The wind turbine blade according to claim 5 wherein lateral openings are provided in the structures defining the lift openings which are aligned with lateral openings in the beams or webs, in order to receive said locking elements therein.

8. The wind turbine blade according to claim 2 wherein the locking elements are locking pins.

9. The wind turbine blade according to claim 1 wherein the lift openings are defined in structures extending laterally from the beams or webs.

10. The wind turbine blade according to claim 9 wherein a locking structure is provided having a locking surface against which a portion of the lifting member can engage.

11. The wind turbine blade according to claim 10 wherein the locking surfaces are configured to allow a push and twist locking connection between the locking structure and a locking portion of a lift member inserted therein.

12. The wind turbine blade according to claim 10 wherein the locking surfaces comprise a lower abutment surface against which a laterally protruding portion on a lift member can abut, and a surface spaced therefrom defining therebetween a retention groove within which the laterally protruding portion can engage when rotated into a locking orientation, and having a cutout region allowing insertion of the lift member and passage of the laterally protruding portion when in a predetermined insertion orientation.

13. The wind turbine blade according to claim 1 wherein the internal load-bearing structure includes a pair of spaced beams or webs each provided with a lateral opening to receive therebetween a lifting bar of a lifting assembly.

14. The wind turbine blade according to claim 13 wherein the lateral openings are provided at or near a neutral axis of the blade.

15. The wind turbine blade according to claim 13 wherein the beam or web portions are of increased thickness at the positions of the openings.

16. The wind turbine blade according to claim 1 wherein one or more internal bulkheads are provided between the blade surfaces extending in the blade chordwise direction in the vicinity of the lifting points.

17. The wind turbine blade according to claim 1 wherein the openings for the lifting members are closable by covers.

18. The wind turbine blade according to claim 17 wherein the covers are pivotably mounted on the blade and are sprung so as to close on removal of a lifting member therefrom.

19. The wind turbine blade according to claim 1 wherein four lifting points are provided, spaced substantially equidistantly about the blade's centre of gravity.

20. The wind turbine blade of claim 1, wherein the at least one beam or web is adapted to make load-bearing connection to lifting members inserted in the openings at or near a neutral axis of the blade.

21. A lifting assembly for a wind turbine blade having opposed blade surfaces, an internal load-bearing structure, and a plurality of lifting points in at least one of the blade surfaces comprising lift openings through the blade surface adjacent or into the load-bearing structure the lifting assembly comprising:
    lifting members for insertion in the lift openings; and
    locking elements for locking the inserted lifting members to the blade, wherein the locking elements comprise locking pins insertable through lateral openings in the blade load-bearing structure into aligned openings in the lifting members.

22. The lifting assembly according to claim 21 wherein the lifting members comprise elongate lift pins.

23. The lifting assembly according to claim 21 wherein the lifting members are suspended from a spreader which in use is connected to a crane lifting eye or hook or the like.

24. The lifting assembly according to claim 21 wherein the lifting members are rigidly connected on a lifting frame.

25. A lifting assembly for a wind turbine blade having opposed blade surfaces, an internal load-bearing structure comprising at least one beam or web having a portion extending between the blade surfaces and generally perpendicularly thereto, and a plurality of lifting points in at least one of the blade surfaces comprising lift openings through the blade surface adjacent or into the load-bearing structure, the lifting assembly comprising elongate lift members for insertion in the lift openings, the elongate lift members having laterally protruding portions for engaging locking surfaces on or connected to the at least one beam or web of the load-bearing structure at the portion extending between the blade surfaces.

26. A lifting assembly for a wind turbine blade having opposed blade surfaces, an internal load-bearing structure, and a plurality of lifting points in at least one of the blade surfaces comprising lift openings through the blade surface adjacent or into the load-bearing structure for receiving lifting members insertable therein, wherein the internal load-bearing structure includes a pair of spaced beams or webs each provided with a lateral opening, the lifting assembly comprising:
    a lift bar for receipt within the opposed web openings, and
    lifting elements in the form of wires, rope or webbing straps, loops, strops or a lifting yoke or the like for extending through the lift openings in the blade and engaging the lift bar.

27. The lifting assembly according to claim 26 wherein the lift bar comprises a pair of oppositely-extending pins which are relatively extendable/retractable.

28. The lifting assembly according to claim 26 wherein the pins of the lift bar are extendable/retractable from a central sleeve.

29. The lifting assembly according to claim 28 wherein one or both of the pins are connected to the central sleeve by a screw thread.

30. A method of handling a wind turbine blade having opposed blade surfaces, an internal load-bearing structure comprising at least one beam or web having a portion extending between the blade surfaces generally perpendicularly thereto, and a plurality of lifting points in at least one of the blade surfaces comprising lift openings through the blade surface adjacent or into the load-bearing structure, the method comprising:

inserting lifting members of a lifting assembly into the respective lift openings; and connecting the lifting members to the at least one beam or web of the load-bearing structure at the portion extending between the blade surfaces.

31. The method of handling a wind turbine blade according to claim 30 where the blade includes lateral openings into the beams or webs, the method including the step of inserting locking elements into aligned openings in the lifting members and beams or webs.

32. A method of handling a wind turbine blade having opposed blade surfaces, an internal load-bearing structure comprising at least one beam or web having a portion extending between the blade surfaces generally perpendicularly thereto, and a plurality of lifting points in at least one of the blade surfaces comprising lift openings through the blade surface adjacent or into the load-bearing structure, wherein a locking structure is provided on the at least one beam or web, the locking structure having a locking surface, the method comprising:

inserting lifting members into the respective lift openings; and connecting the lifting members to the at least one beam or web at the portion extending between the blade surfaces by engaging portions of the lifting members against the locking surface by rotating the lifting members into a locking orientation.

33. A method of handling a wind turbine blade having opposed blade surfaces, an internal load-bearing structure, and a plurality of lifting points in at least one of the blade surfaces comprising lift openings through the blade surface adjacent or into the load-bearing structure for receiving lifting members insertable therein, wherein the internal load-bearing structure includes a pair of spaced beams or webs each provided with a lateral opening, the method comprising:

a. introducing a lift bar into the blade between load-bearing webs;

b. inserting a lifting connection structure comprising wires, rope or webbing straps, loops, strops or a lifting yolk or the like adjacent the load-bearing webs through the openings in the blade surface; and c. arranging the lift bar so as to extend between the load-bearing webs and fitting into the opposed openings whilst engaging the lifting connection structure.

34. The method of handling a wind turbine blade according to claim 33 wherein the lift bar is extendable/contractible and is introduced between the webs in a contracted configuration, and is extended to fit into opposed openings whilst engaging the lifting connection structures.

35. A lifting arrangement comprising:

a wind turbine blade comprising:
opposed blade surfaces;
an internal load-bearing structure comprising at least one beam or web having a portion extending between the blade surfaces generally perpendicularly thereto; and
a plurality of lifting points in at least one of the blade surfaces comprising lift openings through the blade surface adjacent or into the load-bearing structure; and a lifting assembly comprising:
lifting members inserted in the lift openings;
wherein the at least one beam or web makes load-bearing connection to the lifting members at the portion extending between the blade surfaces.

\* \* \* \* \*